United States Patent [19]

Brunie et al.

[11] 3,726,916
[45] Apr. 10, 1973

[54] 6-HYDROPEROXYHEXANOIC ACID PREPARATION

[75] Inventors: Jean-Claude Brunie; Michel Costantini; Noel Crenne, all of Lyon; Michel Jouffret, Villeurbanne, all of France

[73] Assignee: Rhone-Poulenc S.A., Paris, France

[22] Filed: Sept. 26, 1969

[21] Appl. No.: 861,464

[30] Foreign Application Priority Data

Sept. 30, 1968 France..............................68168175

[52] U.S. Cl.........260/531 R, 260/456 P, 260/456 R
[51] Int. Cl.............................................C07c 73/06
[58] Field of Search............260/526 R, 478, 533 C, 260/531 R

[56] References Cited

UNITED STATES PATENTS 2,782,219  2/1957  Cleaver............................260/531 R
2,790,004  4/1957  Dougherty.........................260/533 C
2,825,742  3/1958  Schueler et al....................260/533 C
3,023,238  2/1962  Chapman et al...................260/533 C
3,260,743  7/1966  Hogeman..........................260/533 C

OTHER PUBLICATIONS

Cleaver et al., Chem. Abstracts, Vol. 53, (1959), page 15,944b
Esterbauer et al., Chem. Abstracts, Vol. 64, (1966), page 20,012b Primary Examiner—James A. Patten
Attorney—Stevens, Davis, Miller & Mosher

[57] ABSTRACT

6-Hydroperoxyhexanoic acid, a novel compound useful for introducing acidic groups into polymers, is made from hexanediol by monosulphonation, followed by oxidation first to convert the —CH$_2$OH group to —COOH and then with hydrogen peroxide.

3 Claims, No Drawings

6-HYDROPEROXYHEXANOIC ACID PREPARATION

The present invention provides the new compound 6-hydroperoxyhexanoic acid and a process for its preparation.

6-Hydroperoxyhexanoic acid can be used as a source of free radicals, especially in catalytic systems of the redox type for the polymerization of ethylenic monomers, e.g. acrylonitrile.

6-Hydroperoxyhexanoic acid is prepared in accordance with the invention by a process which comprises oxidizing a monosulphonate of 1,6-hexanediol to a sulphonate of 6-hydroxyhexanoic acid, converting this carboxylic acid into an alkali metal salt thereof, oxidizing the latter with hydrogen peroxide to an alkali metal salt of 6-hydroperoxyhexanoic acid, and finally liberating the 6-hydroperoxyhexanoic acid by acidification. In more detail, this process is effected as follows:

1. The monosulphonate of 1,6-hexanediol is prepared by reaction of a halide of an alkanesulphonic acid, cycloalkanesulphonic acid or benzenesulphonic acid with 1,6-hexanediol at a temperature of 0° to 30°C, preferably below 25°C, in the presence of a tertiary base. Methanesulphonyl chloride is an example of a suitable halide of a sulphonic acid. Trimethylamine, triethylamine and pyridine can, for example, be used as tertiary bases.

The hexanediol and the sulphonic acid halide are generally used in stoichiometric amounts, but an excess of 1,6-hexanediol has no harmful effect on the reaction. Equally, the amount of tertiary base employed can correspond to the amount theoretically required for fixing the hydrogen halide acid liberated by the reaction, or can be greater than this. The reaction is best carried out in an anhydrous solvent. Tetrahydrofuran is particularly suitable.

During this reaction varying amounts of disulphonates of 1,6-hexanediol also form, which can be separated from the monosulphonate by extracting the latter with diethyl ether. The diol can be liberated by saponification of the disulphonate and used in a fresh operation. The mixture of monosulphonate and disulphonate can also, if desired, be used for the next stage, as the disulphonate does not interfere.

2. The oxidation of the monosulphonate of 1,6-hexanediol to give the monosulphonate of 6-hydroxyhexanoic acid can be carried out with any oxidizing agent usually employed to convert a $-CH_2OH$ group into a $-CO_2H$ group. The temperature of this stage varies depending on the oxidizing agents used. By way of example, the oxidation of the monosulphonates of hexanediol can be carried out in a neutral or acid medium with an alkali metal permanganate at a temperature of 10° to 30°C.

The sulphonate of 6-hydroxyhexanoic acid is converted to its alkali metal salt, for example sodium salt, by neutralization employing a conventional process.

3. The oxidation of the sulphonate of the alkali metal salt of 6-hydroxyhexanoic acid yields the alkali metal salt of 6-hydroperoxyhexanoic acid from which the acid is liberated by acidification. The oxidation is carried out with hydrogen peroxide in an alkaline aqueous-alcoholic solution. The reaction temperature can be between −10° and +20°C and is preferably about 0°C.

The following Example illustrates the present invention.

EXAMPLE

1. Preparation of the monomethanesulphonate of 1,6-hexanediol

Sixty g of 1,6-hexanediol (0.508 mol), 57.8 g of methanesulphonyl chloride (0.505 mol) and 170 cm³ of anhydrous tetrahydrofuran are introduced into a 500 cm³ three-necked glass flask equipped with a reflux condenser, a dropping funnel and a stirring system. The stirring is started and 79 g (1 mol) of pyridine are then added to the resulting homogeneous solution over the course of 3 hours while the temperature in the flask is kept at 20°C. Pyridinium chloride precipitates at the rate at which the reaction occurs. After completion of the addition the mixture is stirred for a further 30 minutes. The contents of the flask are added to 325 cm³ of a 10 percent by weight aqueous solution of hydrochloric acid (0.89 mol) kept at 20 ° − 25°C. The limpid solution thus obtained is extracted three times with 200 cm³ of diethyl ether and the combined ethereal solutions are then successively washed twice with 50 cm³ of distilled water and once with a saturated aqueous solution of sodium bicarbonate. The ether solution is then dried by stirring with anhydrous sodium sulphate and the ether and tetrahydrofuran present are distilled off, initially at ordinary pressure and then with the pressure progressively lowered to 200 mm of mercury and then to 0.05 mm of mercury so that the temperature does not exceed 40°C in the liquid phase. The distillation residue is dried for 1 hour at 40°C under a pressure of 0.5 mm of mercury.

Seventy-seven g of a white pasty product melting at 40°C are thus obtained, and determination of the alcohol groups thereof (by acetylation with acetic anhydride) shows that it contains 42.5 g of 1,6-hexanediol monomethanesulphonate, the remainder being the 1,6-hexanediol disulphonate. Infrared spectrography confirms this result, as does NMR spectrography, which furthermore reveals the presence of slight traces of 1,6-hexanediol.

2. Oxidation of the monomethanesulphonate of 1,6-hexanediol

Sixty-five g of the product obtained above (that is to say 35.9 g of monosulphonate or 0.183 mol) and 200 g of distilled water are introduced into a 2 liter three-necked glass flask equipped with a stirrer system, a reflux condenser, a thermometer and a dropping funnel. A sulphuric acid solution of potassium permanganate, obtained by adding 6.77 cm³ of 36 N sulphuric acid (0.123 mol of $H_2SO_4$) and 39 g of $KMnO_4$ (that is to say 0.246 mol) is added to the flask, the contents of which are kept at 20°C, over the course of 1 hour 30 minutes. The reaction mixture is kept under these conditions for 30 minutes after the end of the addition of the oxidizing solution.

Three hundred cm³ of diethyl ether are then introduced into the flask the contents of which are filtered to separate off the precipitated manganese dioxide. The flask is rinsed with 300 cm³ of diethyl ether which is used to wash the manganese dioxide. This wash ether is combined with the aqueous-ethereal filtrate already obtained and the whole is neutralized by adding 30 g of sodium bicarbonate. The neutralized solution is twice treated with 50 cm³ of diethyl ether and the aqueous solution resulting from this treatment is then acidified to pH = 1 by adding 10 percent hydrochloric acid solution. The acidified aqueous phase is extracted four times with 250 cm³ of diethyl ether. The ether extract is twice washed with 50 cm³ of water and then dried with sodium sulphate. The ether is distilled at normal pressure and then under reduced pressure (0.8 mm of mercury) at 20°C. 18.3 g of a white solid product are thus obtained, found to contain 90% of the methanesulphonate of 6-hydroxyhexanoic acid (that is to say 0.083 mol) by acidimetric determination. The infrared and NMR spectra are characteristic of a compound of formula $CH_3SO_3$—$(CH_2)_5$—COOH.

The acid thus obtained is converted to its sodium salt by reaction with 7 g (0.083 mol) of sodium bicarbonate in 130 cm³ of distilled water at 20°C.

The water is removed by distillation under reduced pressure. After drying 24 g of a white viscous solid are obtained, consisting of the partially hydrated sodium salt.

3. Preparation of 6-hydroperoxyhexanoic acid.

The 24 g of the sodium salt obtained above, 130 cm³ of methanol and 15 cm³ of water are introduced into a 500 cm³ three-necked glass flask equipped with a reflux condenser, a dropping funnel, a stirrer system and a thermometer. The contents of the flask are cooled to 0°C and 60 g (0.48 mol) of 30 percent by weight hydrogen peroxide and 15 g of a 50 percent by weight aqueous solution of potassium hydroxide are then added slowly and successively. The reaction is exothermic. The temperature of the flask is allowed to return to 20°C and the mixture is kept under these conditions for 16 hours. The excess hydrogen peroxide is removed by successive washing, first with 4 times 200 cm³ of diethyl ether, and then with 3 times 200 cm³ of ethyl acetate. In total, 4 g of $H_2O_2$ are extracted in this way. The alkaline aqueous-methanolic solution is then acidified to pH 4 by adding 5 N hydrochloric acid, and extracted 6 times with 150 cm³ of ethyl acetate. The ethyl acetate is distilled in vacuo (100 mm of mercury) at 25° - 30°C and then under 3 mm of mercury.

8.8 g of a viscous product are obtained, which is subjected to a polarographic analysis in the following manner. A carrier electrolyte is first used, consisting of an aqueous 0.1 M KCl solution in which the product obtained gives a reduction wave of which the half-wave potential is −0.05 V (relative to Ag/AgCl). In this medium, hydrogen peroxide gives a reduction wave of −0.860 V. An 0.3 M solution of lithium chloride in a mixture of equal weights of methanol and benzene is thereafter used, in which the compound obtained gives a reduction potential of −0.950 V, and which shows that the product obtained does not contain a peracid group. The hydrogen peroxide is then determined by polarography relative to standard solutions. The product obtained contains 2 percent of $H_2O_2$. By determining the total hydroperoxide oxygen by iodometry it is found, after subtracting the peroxide oxygen attributable to $H_2O_2$, that 0.037 mol of hydroperoxide have formed. Determination of the acid groups shows that there are as many —COOH groups in the product obtained as there are —OOH groups not attributable to hydrogen peroxide.

By infrared spectrography 6-hydroperoxyhexanoic acid shows the following characteristic bands:

acid characteristics = OH— and 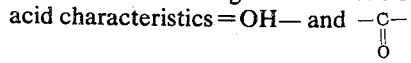

bands at 5.88μ non-acid OH bands at 3 - 3.1μ.

In NMR spectrography the product shows the following characteristic bands:

—COOH and —OOH bands: at −0.32 tau
—$CH_2$OO—: triplet centered on 6.04 tau
—$CH_2$—COO—: multiplet centered on 7.66 tau
other —$CH_2$—: multiplet around 8.4 tau 6-Hydroperoxyhexanoic acid was used in a catalytic system of the redox type for the preparation of polyacrylonitrile, using the procedure indicated below.

One thousand cm³ of N/10 sulphuric acid, 70 g of acrylonitrile and 1.29 g of Mohr salt followed by a few drops of concentrated sulphuric acid are introduced with stirring into a container fitted with a stirrer and a reflux condenser, in which the air has been carefully replaced by nitrogen. The mixture is heated to 75°C and a solution of 1.6 g of the viscous product obtained under 3) in 20 cm³ of water is then added. The final mixture is then heated for 3 hours under reflux; the temperature is then 93°C.

The polymer which has precipitated is filtered off and then washed 5 times with 500 cm³ of boiling water. After filtering and drying at 70°C under 15 mm of mercury 49 g of a white polymer are obtained, of which an 0.2 percent strength solution in dimethylformamide has a specific viscosity of 0.411 at 25°C.

We claim:

1. A process for the preparation of 6-hydroperoxyhexanoic acid which comprises oxidizing with neutral or acid permanganate a monosulphonate of 1,6-hexanediol to a sulphonate of 6-hydroxyhexanoic acid, converting this carboxylic acid into an alkali metal salt thereof oxidizing the latter with hydrogen peroxide to an alkali metal salt of 6-hydroperoxyhexanoic acid, and finally liberating the 6-hydroperoxyhexanoic acid by acidification.

2. Process according to claim 1 in which the monosulphonate is a lower alkane sulphonate.

3. Process according to claim 2 in which the sulphonate is a methanesulphonate.

* * * * *